United States Patent [19]

Erickson

[11] Patent Number: 5,398,468
[45] Date of Patent: Mar. 21, 1995

[54] PANEL AND CONNECTOR ASSEMBLY

[76] Inventor: Arvid L. Erickson, 21365 Hamburg Ave., Lakeville, Minn. 55044

[21] Appl. No.: 17,006

[22] Filed: Feb. 12, 1993

[51] Int. Cl.$^6$ .............................. E04B 1/61; E04B 2/78
[52] U.S. Cl. .................................. 52/282.3; 52/36.1;
52/36.4; 52/266; 52/271; 52/586.2; 211/94;
403/402
[58] Field of Search ...................... 52/36.1, 36.4, 36.5,
52/266, 271, 272, 281, 282.1, 282.2, 282.3,
582.1, 586.1, 586.2, 468, 239; 403/402; 211/94,
87

[56] References Cited

U.S. PATENT DOCUMENTS

| | | |
|---|---|---|
| 3,101,817 | 8/1963 | Radek . |
| 3,174,592 | 3/1965 | Berman et al. . |
| 3,323,819 | 6/1967 | Barker . |
| 3,416,275 | 12/1968 | Loghem et al. ................ 52/282.3 |
| 4,021,973 | 5/1977 | Hegg et al. ..................... 52/239 |
| 4,638,614 | 1/1987 | Wilcox .......................... 52/239 |
| 4,645,374 | 2/1987 | Erickson et al. . |
| 4,805,783 | 2/1989 | Mayer ........................... 211/94 |
| 4,840,440 | 6/1989 | Dieter ........................... 403/402 |
| 4,944,416 | 7/1990 | Petersen et al. ................ 52/36.5 |

FOREIGN PATENT DOCUMENTS 721819 12/1931 France ................. 403/402

Primary Examiner—Michael Safavi
Attorney, Agent, or Firm—Burd, Bartz & Gutenkauf

[57] ABSTRACT

A fixture having a plurality of upright panels and a top joined together with vertical connectors and horizontal inserts. Adjacent edges of the panels have complimentary beveled faces and aligned grooves extended normal to the beveled faces. The connectors have flat webs and ribs located in surface engagement with the beveled faces of adjacent panels. Flanges joined to the outer end of the webs engage the panels and cooperate with the ribs and lips joined to the inner end of the web to hold the panels in a structurally stable and tight sealed engagement at either a 45 degree relationship or a 90 degree relationship relative to each other.

31 Claims, 4 Drawing Sheets

PANEL AND CONNECTOR ASSEMBLY

FIELD OF THE INVENTION

The invention relates to display panel structures having structural joints for connecting adjacent panels together.

BACKGROUND OF THE INVENTION

Several panel support structures and connectors have been used to assemble shelving, display stands, partitions, walls and the like. Examples of these support structures are disclosed by Radek in U.S. Pat. No. 3,101,817; and Berman et al in U.S. Pat. No. 3,174,592. Radek discloses a wall panel support structure comprising a generally upright framework having a plurality of transverse brackets. The brackets have upper and lower channels to accommodate the top and bottom edges of the panels. Berman et al discloses clips mounted on the ends of panels that engage a slotted vertical support standard to hold the panels in assembled relation.

Numerous joint structures and connectors have been used to join adjacent panels together. These structures include dowels, pins, clips, wood strips and metal extrusions. Examples of structural joints for panels are disclosed by Williamson in U.S. Pat. No. 1,888,523; Barker in U.S. Pat. No. 3,323,819; and Logan in U.S. Pat. No. 4,438,578. Williamson discloses a structural joint comprising a generally L-shaped locking strip having bent longitudinal ends. The locking strip fits into linear grooves of adjacent panels to hold adjacent mitered edges of the panels together. Barker discloses a joinder described as a symmetrical L-bar located between bent end flanges of normally disposed panels. A pair of cylindrical wedges cooperate with the joinder to hold the panels in assembled relation with each other. Logan disclose a right angle bracket adapted to fit into channels in adjacent beveled ends of a frame structure. The outer ends of the bracket have bent over portions that fit into cavities in the channels.

SUMMARY OF THE INVENTION

The invention is directed to a grooved panel assembly for the outer surface of a wall, counter fixture or the like for displaying merchandise. The assembly has a plurality of panels assembled in a top to bottom relation. Elongated connectors secure adjacent edges of the panels together in a manner which provides a sturdy and structural stable connection. The panels are provided with beveled edges with each panel end having at least one normally extended slot.

Connectors locked onto the adjacent edges of the panels hold the ends of the panels in a tight assembled relationship at either a 90 degree angle or a 45 degree angle. The connectors are mounted on panels with a minimum of labor and time and without the use of special tools. The connectors form corners of a structure, such as a fixture, made up of a number of connected panels. The connectors have convex curved outer apexes and flanges that protect the corners of the structure and eliminate any sharp or abrupt edges. Each panel has a plurality of laterally spaced transverse grooves accommodating channel-shaped inserts. The top and bottom edges of each panel have end grooves whereby the inserts located in the end grooves of adjacent panels provide additional holding support to the panel assembly. The inserts also protect against wear of the transverse grooves.

The preferred form of the panel and connector assembly has a first panel with inner and outer surfaces extended into a first end having a first beveled face. A first slot is located normally to the beveled face adjacent the inner surface. A second panel has inner and outer surfaces extended into a second end having a face complimentary to the first beveled face of the first panel. The second panel has a second slot extended normal to the second beveled face adjacent the inner surface thereof. A connector is used to join the first panel to the second panel. The connector has a generally flat web located between the first and second beveled faces. Lip means joined to the web extends into the first and second slots. The middle section of the web has ribs located in surface engagement with the first and second beveled faces. Flange means joined to the outer edge of the web is engageable with the panels so that the lip means and flange means hold the first and second faces in tight surface engagement with the ribs and fix the angular relationship between the first and second panels at approximately a 45 degree angle.

The first beveled face can also have a third slot extended normal to the first beveled face adjacent to the outer surface of the first pane. The second panel has a fourth slot extended normal to the second beveled face adjacent to the outer surface thereof. The ribs extend into the third and forth slots. The flange means is engageable with the panels so that the ribs, lip means, and flange means hold the first and second beveled faces in tight surface engagement with the web and fix the angular relationship between the first and second panels at approximately a 90 degree angle. The flange means extends at an angle relative to the ribs and lip means to provide a hooked grip and tight sealed joint between adjacent ends of the panels.

The connector has a generally flat web provided with an inner edge and an outer edge. A pair of lips are joined to the inner edge and extend in outward directions from the web. A pair of ribs are connected to opposite flat sides of the web and extend in outward directions from the web. A pair of flanges are joined to the outer edge of the web with a nose portion having a convex curved outer surface. The flanges have a length greater than the length of the lips and ribs. When the connector is in assembled relation with the panel, the flanges are in tight surface engagement with the outer surfaces of the panels.

A plurality of channel-shaped inserts are located in transverse grooves that are open to the outer surfaces of the panels. The inserts protect the grooves from wear in use of the panel assembly. The first panel has a third end having a first end groove. A third panel has a fourth end having a second end groove complimentary to the first end groove of the first panel. An insert extends into the first and second end grooves to hold the first panel on the second panel in an end to end assembled relation. The insert has a channel-shaped body with generally flat outer walls located in surface engagement with the third and fourth ends of the panels. The insert extends normally to the connector to provide lateral support to the panel assembly.

The panel and connector assembly of the invention is shown and described as a fixture for supporting merchandise. Other uses and advantages of the panel and connector are not precluded by this disclosure.

DESCRIPTION OF PREFERRED EMBODIMENTS

Figure 1:
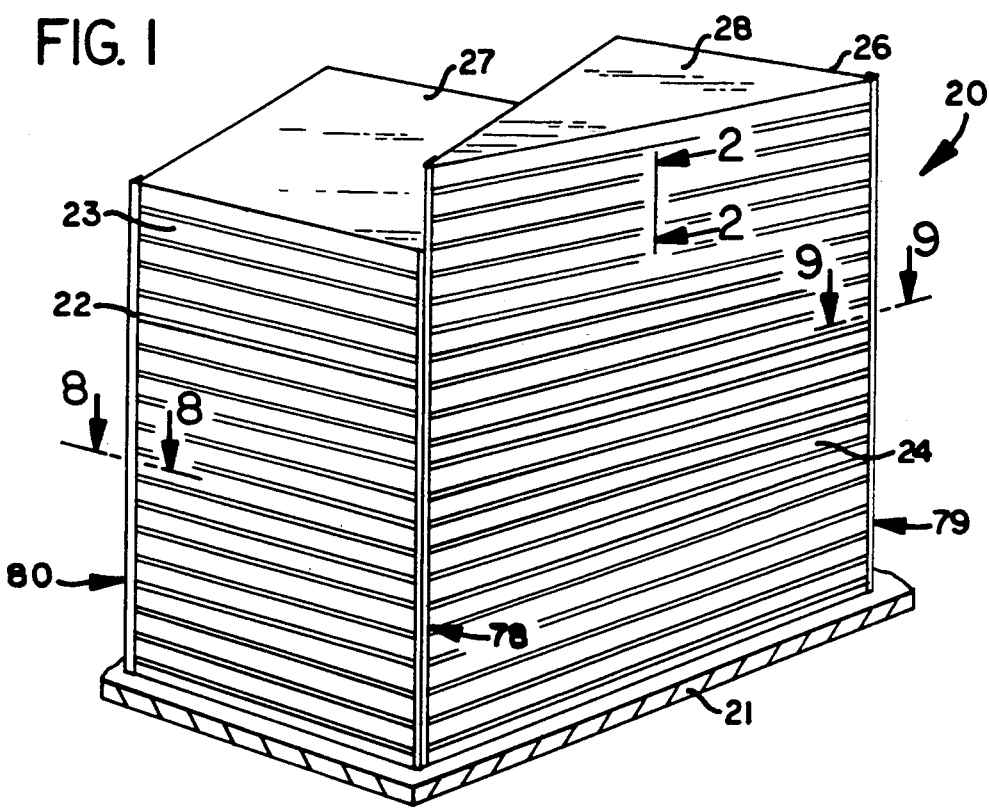
FIG. 1 is a perspective view of a fixture having the panels, connectors and inserts of the invention.

Referring to FIG. 1, there is shown a fixture indicated generally at 20 for displaying and supporting merchandise, cash registers, and the like in a retail or commercial environment. Fixture 20 is supported on floor 21 and has a plurality of horizontally grooved panels comprising a front panel 23, side panels 22 and 24 and a rear panel 26. Top sections 27 and 28 located at separate elevations are attached to the front, side, and rear panels 22, 23, 24 and 26.

Figure 2:
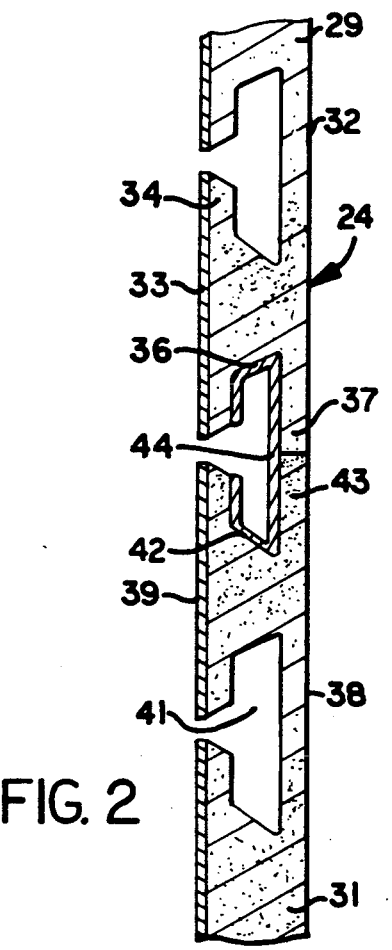
FIG. 2 is an enlarged sectional view taken along line 2—2 of FIG. 1.

Referring to FIG. 2, side panel 24 comprises a plurality of panel members 29 and 31. Panel member 29 has an inner continuous surface 32 and an outer surface 33. Panel member 31 has an inner continuous surface 38 and an outer surface 39. The outer surfaces 33 and 39 of panel members 29 and 31 are interrupted with a plurality of vertically spaced horizontal grooves 41. All of panels 22-24 and 26 are assembled with panel members 29 and 31 having grooves 41. Grooves 41 run the length of panel members 29 and 31. Grooves 41 can be spaced three inches from center to center, or, alternative groove spacing can be made on 2, 4, 6 and 8 inch centers. Grooves 41 are generally channel-shaped grooves. The base portions or tails of the grooves 41 converged inwardly toward outer surfaces 33 and 39 defined by middle portion 34 of panel members 29 and 31. The outer ends of the cross portions or heads of grooves 41 diverge outwardly. Grooves 41 can have other shapes and sizes like a T-shaped groove 134, shown in FIG. 4. Tops 27 and 28 and panel members 29 and 31 of panels 22-24 and 26 may be made of wood, plastic, plastic and wood laminates and metal. The outer surfaces 33 and 39 of the panel members 29 and 31 may be painted, unfinished, mirrored and/or wood veneered. Panel members 29 and 31 may have a fiber-board core and a veneer outer face. The panels can be used for wall displays, free standing fixtures, as shown in FIG. 1. A variety of brackets, hangers, and shelving (not shown) made of wood, metal or plastic are used with the panels to display merchandise. The supports have generally hook-shaped heads that fit into grooves 41 to attach the supports to panels 22, 23, 24 and 26.

Returning to FIG. 2, panel member 29 has a lower end 37 with a horizontal end groove 36 located adjacent a complimentary horizontal end groove 42 on the upper end 43 of panel member 31. A generally horizontal insert 44 couples the adjacent ends 37 and 43 of panel members 29 and 31 together. Insert 44 can also be positioned in grooves 41 to protect the panel members 29 and 31 from wear during use with brackets or hangers to display merchandise and the like.

Figure 5:
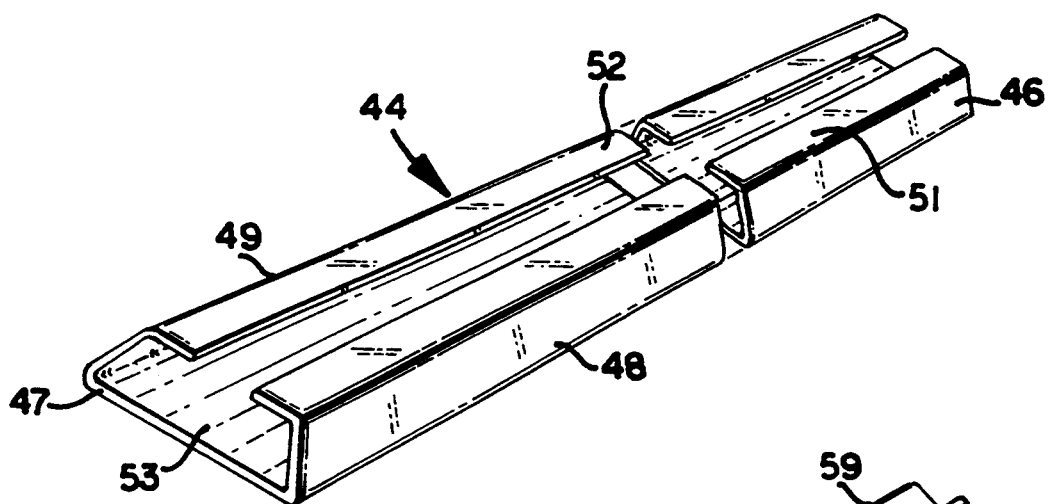
FIG. 5 is a foreshortened perspective view of the insert of FIG. 2.

Referring to FIG. 5, there is shown insert 44 comprising a channel shaped body 46 having a flat linear back wall 47 joined to a pair of inwardly inclined side walls 48 and 49. The side walls 48 and 49 have inwardly directed ends 51 and 52. Walls 47-49 and ends 51 and 52 define a C-shaped channel 53 which is complimentary to end grooves 36 and 42 and the cross portion or head of grooves 41 whereby insert 44 has a tight fit relation with panel members 29 and 31. Insert 44 extends normally relative to connectors 78, 79 and 80 to provide lateral support to fixture 20.

As shown in FIG. 1, a generally vertical connector indicated generally at 80 couple the adjacent ends of the panels 22 and 23. A connector indicated generally at 78 joins the opposite edge of panel 23 to side panel 24. A connector 79 joins side panel 24 to back panel 26.

Figure 12:
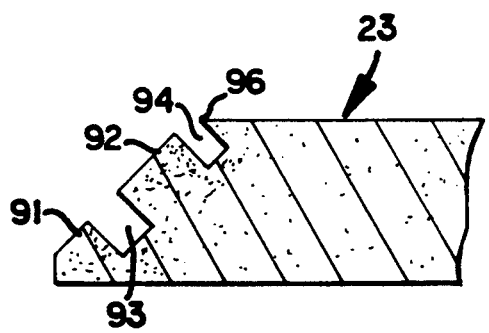
FIG. 12 is a sectional view of an end of a panel tapered and having one slot to accommodate a connector.

Referring to FIG. 12, there is shown a cross section of an end of panel 23 shaped to accommodate connector 80. Panel 23 has a beveled or tapered end face 92. End face 92 has a 45 degree angle to form a right angle corner of fixture 20. The outer end portion 91 of surface 92 has a first groove 93. Groove 93 projects normal to the plane of face 92 and is at an angle of 45 degrees with respect to the outer surface of panel 23. First groove 93 has a generally rectangular cross section extending the length of the end of panel 23. The inner end of surface 92 is interrupted with a second groove 94. Groove 94 projects normal to the plane of face 92 and is at an angle of 45 degrees with respect to the outer surface of panel 23. Groove 94 forms with the inner surface of panel 23 an edge 96. End face 92 is used to form a 90 degree angle corner of fixture 20. The groove 94 has a generally rectangular cross section that extends the length of the end of panel 23. Grooves 93 and 94 are formed with a circular saw or router bit. Other cutting tools and combination of tools can be used to cut grooves 93 and 94 and face 92. The end face 92 and grooves 93 and 94 can be simultaneously made with a combined plane and saw tool. The beveled face 98 and grooves 99 and 101 are made in panel 22 in the same manner.

Figure 13:
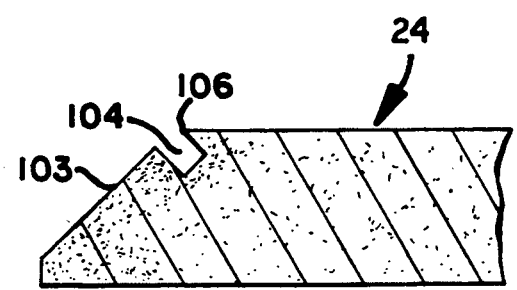
FIG. 13 is a sectional view of a end of a panel tapered and having two slots to accommodate a connector.

Referring to FIG. 13, there is shown a cross section of an end of panel 24 shaped to accommodate connection 79. Panel 24 has beveled end face 103. The inner end of surface 103 has a groove 104 that projects normal to the plane of surface 103 forming a transverse edge 106 on the inside of panel 24. End face 103 is used to form a 45 degree angle corner of fixture 20. Groove 104 has a generally rectangular cross section that extends the length of panel 24. Cutting tools and combination of tools can be used to cut groove 104. Beveled face 107 and groove 108 are made in panel 26 in the same manner.

Figure 10:
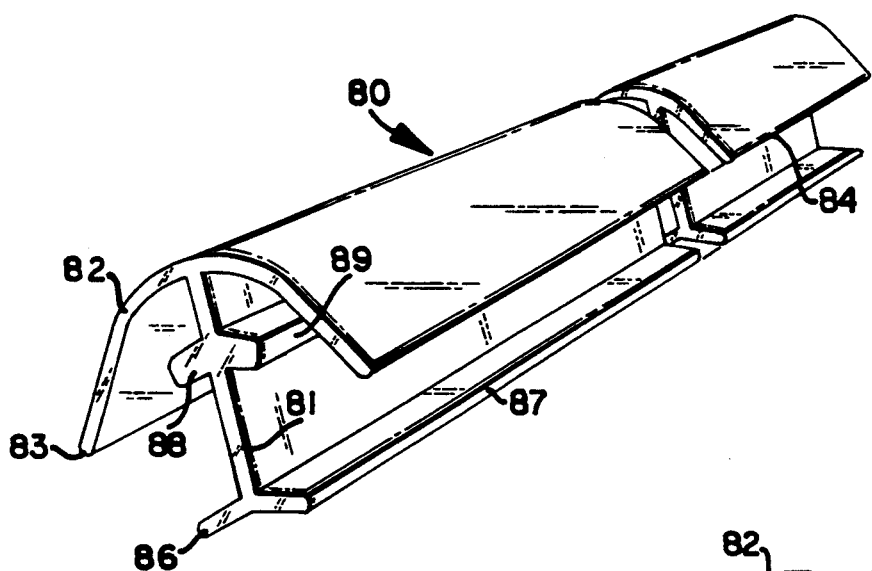
FIG. 10 is a foreshortened perspective view of the connector of FIGS. 8 and 9.
Figure 11:
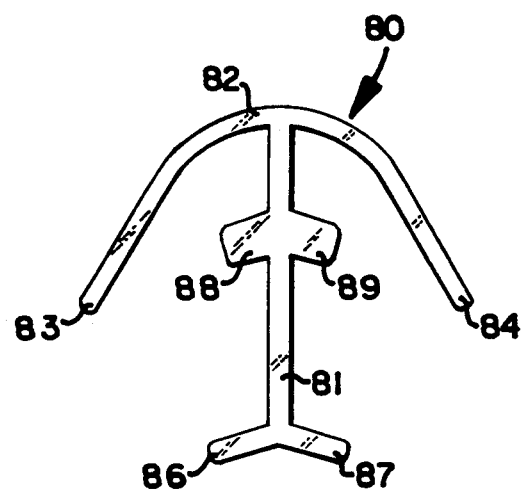
FIG. 11 is an end view of the connector of FIGS. 8 and 9.

Referring to FIGS. 10 and 11, there is shown connector 80 comprising a flat linear web 81 joined to a convex curved nose or apex 82. Web 81 has opposite flat surfaces that extend the length of connector 80. Outwardly directed flanges 83 and 84 are joined to opposite sides of nose 82. The flanges 83 and 84 are angularly disposed relative to each other. The outer end of web 81 is joined to nose 82. The inner end of web 81 is joined to lips 86 and 87. The lips 86 and 87 extend in outward directions from web 81 and are angularly disposed relative to web 81. Lips 86 and 87 are shorter than flanges 83 and 84 and are disposed at an angle relative to the longitudinal planes of flanges 83 and 84. The middle portion of web 81 is joined to ribs 88 and 89. Ribs 88 and 89 extend in outward directions from opposite sides of web 81 generally parallel to lips 86 and 87. Ribs 88 and 89 are angularly disposed relative to web 81. The ribs 88 and 89 are shorter than flanges 83 and 84 and lips 86 and 87 and are disposed at an angle relative to the longitudinal planes of flanges 83 and 84. Connector 80 can be a metal extrusion, plastic, wood and like structural material. The structures of connectors 78 and 79 are identical to the structure of connector 80.

Figure 8:
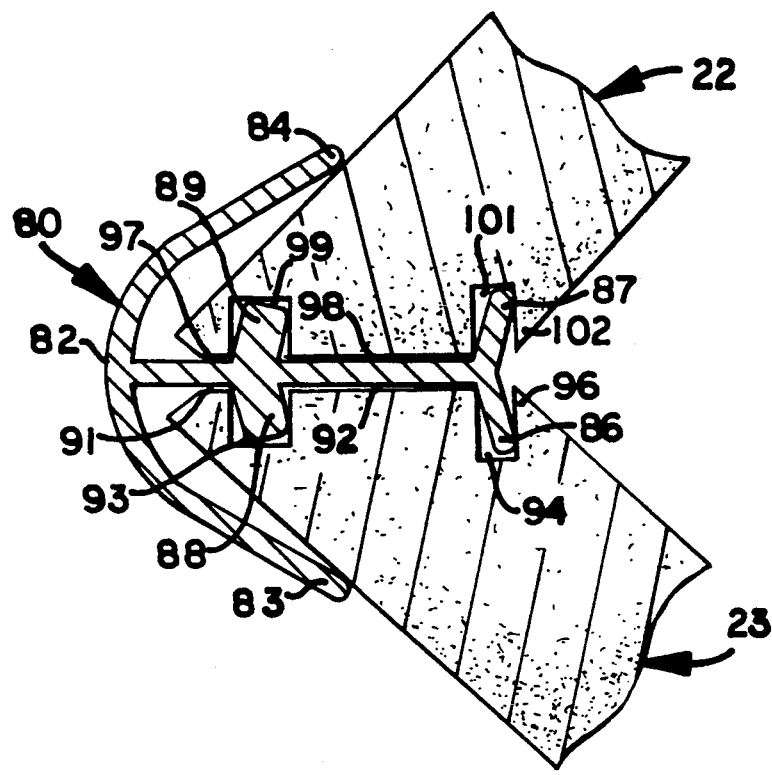
FIG. 8 is an enlarged sectional view taken along line 8—8 of FIG. 1.

Referring to FIG. 8, connector 80 is located in assembled relation with the adjacent ends of panels 22 and 23 to retain the panels in fixed relation relative to each other. Panel 22 has a flat angularly inclined end surface 98 and a first groove 99 on outer portion 97 and a second groove 101 at the inner end thereof. Groove 101 forms a transverse edge 102 on the inside of panel 22. Edge 96 of panel 23 and edge 102 of panel 22 face each other to form the inside corner of the fixture. Web 81 is located in tight surface engagement with end surfaces 92 and 98. The outer end of flange 83 is located in surface engagement with the outside of the panel 22. The outer end of flange 84 is located in surface engagement with the outside of panel 23. The outer corners of panels 22 and 23 are transversely cut off to prevent jamming of material in the inside corners of connector 80. This ensures tight surface engagement of faces 92 and 98 against web 81. Lips 86 and 87 are located in grooves 94 and 101, respectively. Ribs 88 and 89 are located in grooves 93 and 99, respectively. Lips 86 and 87 and ribs 88 and 89 being located at an angle relative to the length of panels 22 and 23 hold or lock the panels in assembled relation with connector 80. Lip 86 and rib 88 hold surface 92 and outside surface of panel 23 in tight surface engagement with web 81 and flange 83, respectively. Lip 87 and rib 89 hold end surface 98 of panel 22 and the outer surface of panel 22 in tight surface engagement with web 81 and flange 84. Lips 86 and 87 extending across the inside corners of panels 22 and 23, ribs 88 and 89 extending into grooves 93 and 99, the flat tight surface engagement of the ends of the panels with web 81, and the surface engagement of the ends of flanges 83 and 84 with the outside of panels 23 and 22 provide a hooked grip and tight sealed joint between adjacent ends of panels 22 and 23 and fix the angular relationship between panels 22 and 23 at approximately 90 degrees. Flanges 83 and 84 with convex nose 82 protect the outer surfaces of panels 22 and 23 located adjacent the joint. Special tools are not required to assembly connector 80 and adjacent panels 22 and 23. Additional parts and adhesives are not used to provide a tight structurally stable joint securing adjacent ends of panels together.

Figure 9:
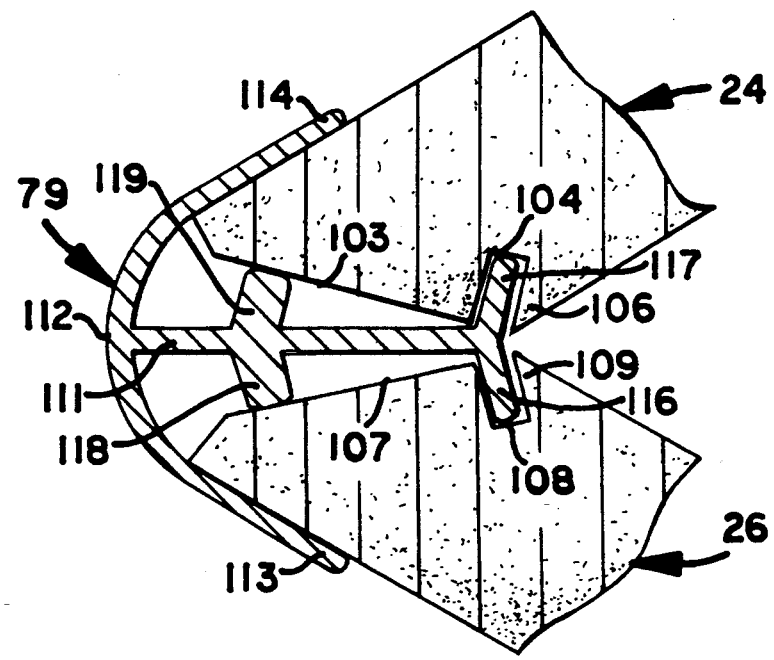
FIG. 9 is an enlarged sectional view taken along line 9—9 of FIG. 1.

Referring to FIG. 9, there is shown connector 79 joining panel 24 to panel 26. Panels 24 and 26 are secured at a approximately 45 degree angle relative to each other. Panel 26 has a flat beveled end face 103 and a groove 104 in the inner end thereof. Groove 104 is normal to end face 103. Groove 104 forms with the inner surface of panel 24 an inner edge 106. Panel 26 has a beveled or angled flat end face 107 having a groove 108 at the inner end thereof. Groove 108 is adjacent to groove 104. Groove 108 forms with the inner surface of panel 24 a transverse edge 109. Edges 106 and 109 are adjacent to each other to form the inside corner of joined panels 24 and 26. Connector 79 is substantially the same as connector 80. Connector 79 has a flat web 111 having outwardly extended ribs 118 and 119 located in surface engagement with the flat end faces 103 and 107. Ribs 118 and 119 extend the full length and width or transverse dimension of faces 103 and 107. The outer end of web 111 is joined to a convex curved nose 112. Outwardly directed flanges 113 and 114 are joined to opposite sides of nose 112. Flanges 113 and 114 extend over the outside surfaces of panels 24 and 26 and are located in surface engagement with the outside surfaces of panels 24 and 26. The inner end of web 111 is joined to lips 116 and 117 extended into grooves 104 and 108. Lips 116 and 117 in conjunction with flanges 113 and 114 provide a hooked grip on panels 24 and 26 which holds the outer surfaces of ribs 118 and 119 in tight surface engagement with end faces 103 and 107 of panels 24 and 26 and fix the angular relationship between panels 24 and 26 at approximately 45 degrees.

Figure 3:
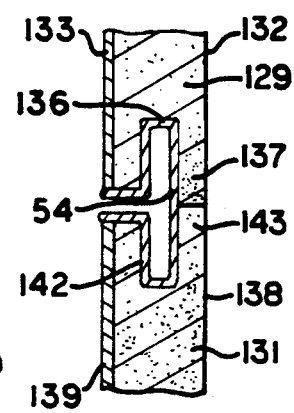
FIG. 3 is and enlarged sectional view similar to FIG. 2 showing a first modification of the panels and inserts of the invention.
Figure 4:
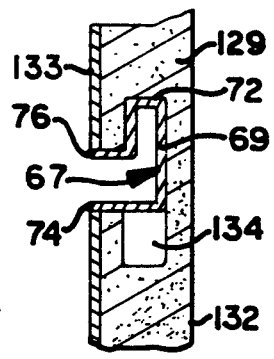
FIG. 4 is an enlarged sectional view similar to FIG. 2 showing a second modification of the insert.
Figure 7:
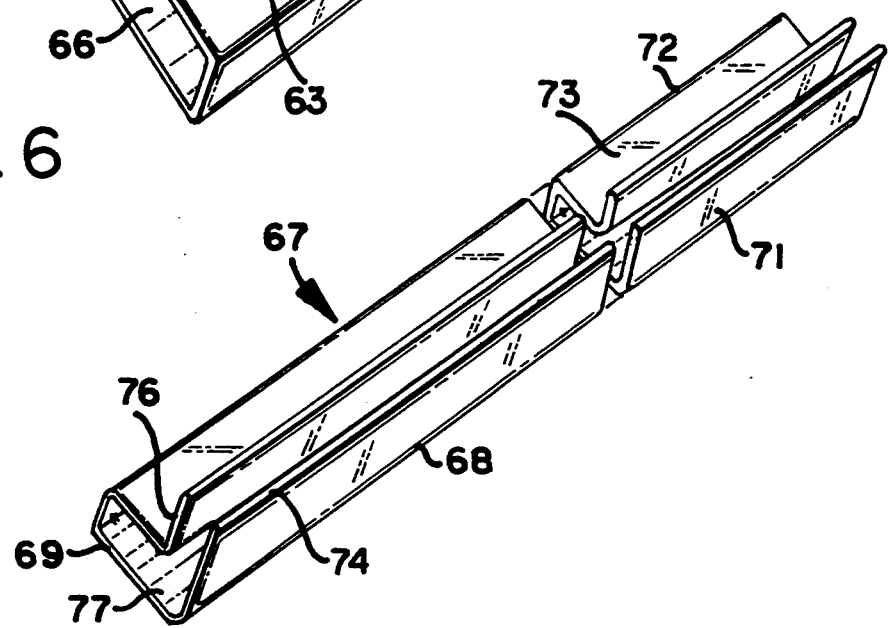
FIG. 7 is a foreshortened perspective view of the insert of FIG. 4.

Referring to FIGS. 3 and 4, there is shown a modification of panel members 129 and 131 used to assemble panels 22, 23, 24 and 26. Panel members 129 and 131 have inner continuous surfaces 132 and 138 and outer surfaces 133 and 139, respectively. The outer surfaces 133 and 139 are interrupted with a plurality of vertically spaced transverse T-shaped grooves 134. Grooves 134 run the length of panel members 129 and 131 and are spaced from center to center substantially similar to grooves 41 on panel members 29 and 31. Spacing of grooves 134 can be made on 2, 3, 4, 6 and 8 inch centers. A variety of backets and the like (not shown) used to display merchandise have generally hook-shaped heads that fit into grooves 134 to attach the brackets to panels 22, 23, 24 and 26. As shown in FIGS. 4 and 7, an L-shaped insert 67 is positioned in groove 134 to protect the panel members 129 and 131 from wear during use of the brackets to display merchandise. Insert 67 comprises a L-shaped body 68 having a flat linear back wall 69 joined to parallel side walls 71 and 72. Side wall 72 is joined to an inwardly directed top wall 73 having an upwardly directed end 76. The top edge of end 76 is aligned with top edge 74 of side wall 71. Walls 71–73 and end 76 define a L-shaped channel 77 that is complimentary to the shape of groove 134 to provide a tight fit relation between panel member 129 and insert 67.

As shown in FIG. 3, panel member 129 has a lower end 137 with a horizontal end groove 136 located adjacent a complimentary horizontal end groove 142 on the upper end 143 of panel member 131. A generally horizontal insert 54 couples the adjacent ends 137 and 143 of panel members 129 and 131 together. Insert 54 can also be positioned in grooves 134 to protect the panel members 129 and 131 from wear during use with brackets.

Figure 6:
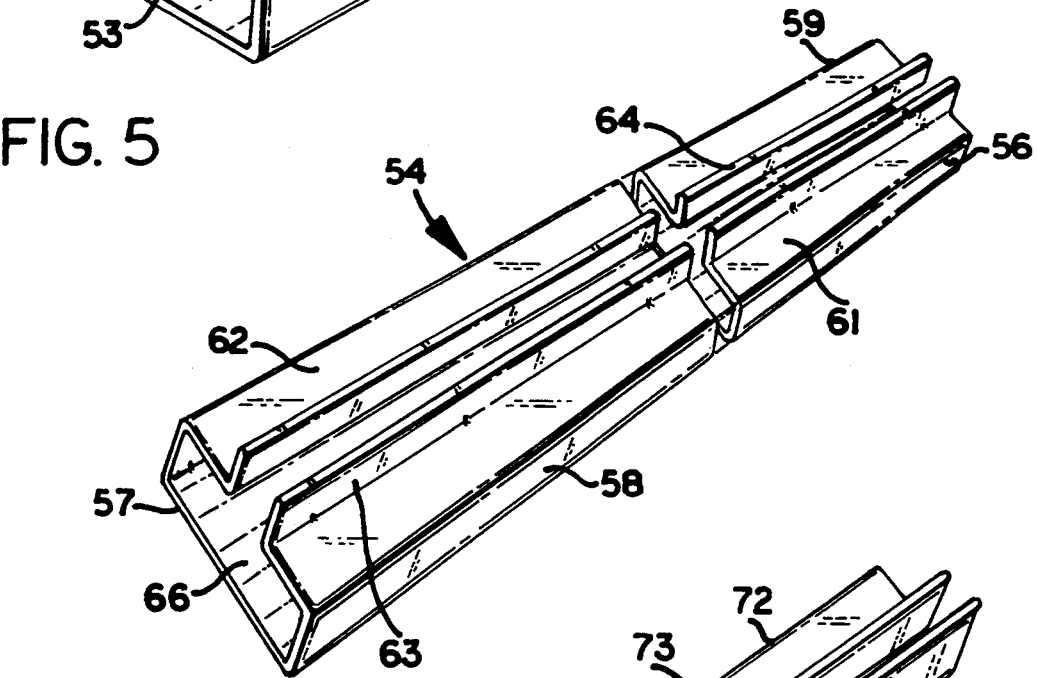
FIG. 6 is a foreshortened perspective view of the insert of FIG. 3.

Referring to FIG. 6, there is shown insert 54 comprising a T-shaped body 56 having a flat linear back wall 57 joined to a pair of upwardly directed side walls 58 and 59. The side walls 58 and 59 are connected to flat linear top walls 61 and 62. Side walls 58 and 59 have upwardly directed ends 63 and 64. Walls 57–59 and 61–62 and ends 63 and 64 form a T-shaped channel 66 that is complimentary to end grooves 136 and 142 of panel members 129 and 131 whereby insert 54 holds panel members 129 and 131 in an end to end assembled relation. Insert 54 extends normal to connections 78-80 to provide lateral support to fixture 20.

While there has been shown and described preferred embodiments of the connector, inserts and panels for fabricating the fixture 20, it is understood that changes in materials, and modifications of the panel, inserts and connector structures can be made by those skilled in the art without departing from the invention. The invention is defined in the following claims.

I claim:

1. A panel assembly comprising: a first panel having an outer surface, an inner surface, an end with a first beveled face extended from the inner surface toward the outer surface thereof, and a slot extended normal to said first beveled face adjacent the inner surface, a second panel having an outer surface, an inner surface, an end with a second beveled face extended from the inner surface toward the outer surface thereof, and a slot extended normal to said second beveled face adjacent the inner surface thereof, connector means joining said first panel to said second panel together in a fixed relationship relative to each other, said connector means having a flat web located between said first and second beveled faces, lip means joined to said web extended into said slots, rib means joined to said web, said rib means located in surface engagement with the first and second beveled faces, and flange means joined to said web, said flange means located in surface engagement with said first and second panels whereby said lip means and flange means hold the faces in surface engagement with said rib means and fix the angular relationship between said first and second panels.

2. The assembly of claim 1 wherein: said lip means comprises generally flat lips joined to an inner edge of the web, said lips projected in outward directions from said web.

3. The assembly of claim 1 wherein: said flange means comprises flanges joined to nose means having a convex curved outer surface, the nose means joined to an outer edge of the web.

4. The assembly of claim 3 wherein: said flanges comprise a first flange located in surface engagement with the outer surface of the first panel, and a second flange located in surface engagement with the outer surface of the second panel.

5. The assembly of claim 1 wherein: said rib means comprise generally flat ribs joined to a middle portion of the web having outer edges located in engagement with the first and second beveled faces.

6. The assembly of claim 1 wherein: said first and second beveled faces have substantially the same transverse length, said web having a transverse length substantially the same as the transverse length of said first and second beveled faces.

7. The assembly of claim 1 wherein: said flange means has a transverse length longer than the transverse length of said lip means.

8. The assembly of claim 1 wherein: said first and second beveled faces have substantially the same transverse and longitudinal lengths, said web has a transverse dimension and a longitudinal length generally the same as the transverse dimension and longitudinal length of the first and second beveled faces, said web having an inner edge and an outer edge, said lip means comprise generally flat lips joined to the inner edge of the web, said rib means comprise generally flat ribs joined to a middle portion of the web, said flange means comprise flanges joined to nose means having a convex curved outer surface, the nose means joined to said outer edge of the web.

9. The assembly of claim 8 wherein: said flanges comprise a first flange located in surface engagement with the outer surface of the first panel, and a second flange located in surface engagement with the outer surface of the second panel.

10. The assembly of claim 1 wherein: said first panel has a transverse bottom surface having a groove open to the bottom surface, a third panel having a transverse top surface with a groove open to the top surface of the third panel, and insert means joining said first and third panels together in assembled relation relative to each other, said insert means having body means extended into the grooves.

11. A panel assembly comprising: a first panel having an outer surface, and inner surface, and an end with a first beveled face extended from the inner surface toward the outer surface thereof, a first slot extended into the first panel normal to said first beveled face adjacent the inner surface of the first panel, and a second slot extended normal to said first beveled face adjacent the outer surface of the first panel, a second panel having an outer surface, an inner surface, and an end with a second beveled face extended from the inner surface toward the outer surface thereof, a first slot extended normal to said second beveled face adjacent the inner surface thereof, and a second slot extended normal to said second beveled face adjacent the outer surface of the second panel, connector means joining said first and second panels together in a fixed relationship relative to each other, said connector means having a generally flat web located between and in surface engagement with the first and second beveled faces, lip means joined to an inner edge of the web and extended into said first slots, rib means joined to said web and extended into said second slots, and flange means joined to an outer edge of the web, said flange means located in surface engagement with the outer surfaces of the first and second panels whereby the lip means, rib means and flange means hold the faces of the panels in fight surface engagement with said web and fix the angular relationship between the first and second panels.

12. The assembly of claim 11 wherein: each panel has groove means, insert means extended into the groove means for holding the panel in general vertical alignment with an adjacent panel.

13. The assembly of claim 11 wherein: said flange means comprise a first flange having an outer end located in surface engagement with the outer surface of the first panel, and a second flange having an outer end located in surface engagement with the outer surface of the second panel, and nose means having a convex curved outer surface joined to said first and second flanges and said web.

14. The assembly of claim 11 wherein: said rib means comprise generally flat ribs joined to a middle portion of the web, said ribs projected in outward directions from said web.

15. The assembly of claim 11 wherein: said first and second beveled faces have substantially the same transverse length, said web having a transverse length substantially the same as the transverse length of said first and second faces.

16. The assembly of claim 15 wherein: said flange means have a transverse length longer than the transverse length of the lip means.

17. The assembly of claim 11 wherein: said first and second beveled edges have substantially the same transverse and longitudinal lengths, said web having a transverse dimension and a longitudinal length generally the same as the transverse dimension and longitudinal length of the first and second beveled faces, said web having an inner edge and an outer edge, said lip means comprise generally flat lips joined to the inner edge of the web and extended in outward directions from said web, said rib means comprise generally flat ribs joined to a middle portion of the web, said flange means comprise first and second flanges joined to nose means having a convex curved outer surface, the nose joined to said outer edge of the web.

18. The assembly of claim 17 wherein: said first and second flanges have outer edges located in surface engagement with the outer surfaces of said first and second panels.

19. The assembly of claim 11 wherein: said first and second panels have transverse surfaces located adjacent the outer surfaces of the panels.

20. The assembly of claim 11 wherein: said first and second panels have a plurality of transverse grooves for accommodating hanger means.

21. The assembly of claim 11 wherein: said first panel has a transverse bottom surface having a groove open to the bottom surface, a third panel having a transverse top surface with a second groove open to the top surface of the third panel, and insert means holding said first and third panels in general vertical alignment relative to each other, said insert means having body means extended into the grooves and providing for a hanger means.

22. A panel assembly comprising: a first panel having an outer surface, an inner surface, a first end with a first beveled face extended from the inner surface toward the outer surface thereof, and a second end with a second beveled face extended from the inner surface toward the outer surface thereof, first slot means extended into the first panel normal to said first beveled face, second slot means extended into the first panel normal to said second beveled face, third slot means extended normal to the second beveled face adjacent the outer surface of the first panel, a second panel having an outer surface, an inner surface, and an end with a third beveled face extended from the inner surface toward the outer surface thereof, fourth slot means extended into the second panel normal to said thirst beveled face, a third panel having an outer surface, an inner surface, and an end with a fourth beveled face extended from the inner surface toward the outer surface thereof, fifth slot means extended into the third panel normal to said fourth beveled face, sixth slot means extended normal to the fourth beveled face adjacent the outer surface of the third panel, first connector means joining the first and second panels together in a fixed first angular relation relative to each other, said first connector means having a web located between the first and third beveled faces, lip means joined to said web and extended into said first and fourth slot means, and rib means joined to said web, said rib means being spaced from the lip means and located in surface engagement with said first and third beveled faces to retain the first and second panels in the first angular relation relative to each other, and second connector means substantially the same as the first connector means joining the first and third panels together in a fixed second angular relation relative to each other, and second connector means having a web located between the second and fourth beveled faces, lip means joined to said web and extended into said second and fifth slot means, and rib means joined to said web, said rib means being spaced from the lip means and extended into said third and sixth slot means to retain the first and third panels in the second angular relation relative to each other.

23. The assembly of claim 22 wherein: each lip means comprises generally flat lips joined to an inner edge of the web, said lips projected in outward directions from said web.

24. The assembly of claim 22 wherein: each connector means has flange means joined to the web, each flange means comprising a pair of flanges joined to nose means having a convex curved outer surface, the nose means joined to an outer edge of the web.

25. The assembly of claim 24 wherein: said flanges of the first connector means comprise a first flange located in engagement with the outer surface of the first panel, and a second flange located in engagement with the outer surface of the second panel.

26. The assembly of claim 22 wherein: each rib means comprise generally flat ribs joined to a middle portion of the web, the ribs of the first connector means having outer edges located in surface engagement with the first and third beveled faces.

27. The assembly of claim 24 wherein: said flange means has a transverse length longer than the transverse length of said lip means.

28. The assembly of claim 22 wherein: said first, second, third and fourth beveled faces have substantially the same transverse and longitudinal lengths, each web having a transverse dimension and a longitudinal length generally the same as the transverse dimension and longitudinal length of the beveled faces, said web having an inner edge and a middle portion, each lip means comprising generally flat lips joined to the inner edge of the web, each rib means comprising generally flat ribs joined to the middle portion of the web.

29. The assembly of claim 24 wherein: said flanges of the second connector means comprise a first flange located in engagement with the outer surface of the first panel, and a second flange located in engagement with the outer surface of the third panel.

30. The assembly of claim 22 wherein: said first panel has a transverse bottom surface having a groove open to the bottom surface, a fourth panel having a transverse top surface with a groove open to the top surface of the fourth panel, and insert means joining said first and fourth panels together in assembled relation relative to each other, said insert means having body means extended into the grooves.

31. The assembly of claim 22 wherein: the first angular relation of the first and second panels is about 90 degrees and the second angular relation of the first and third panels is about 45 degrees.

* * * * *